United States Patent [19]

Graves

[11] 4,403,419

[45] Sep. 13, 1983

[54] SURFACE PROFILE RECORDER

[75] Inventor: J. Robert Graves, Chillicothe, Ohio

[73] Assignee: The Mead Corporation, Dayton, Ohio

[21] Appl. No.: 275,565

[22] Filed: Jun. 22, 1981

[51] Int. Cl.³ .............................................. G01B 5/20
[52] U.S. Cl. ..................................... 33/174 P; 73/105
[58] Field of Search ......................... 73/105; 33/174 P

[56] References Cited

U.S. PATENT DOCUMENTS

| | | | |
|---|---|---|---|
| 2,620,655 | 12/1952 | Priest | 73/105 |
| 3,453,877 | 7/1969 | Anderson | 73/105 |
| 3,540,270 | 11/1970 | Wolfer | 73/78 |
| 4,288,926 | 9/1981 | Long | 33/174 P |

Primary Examiner—S. Clement Swisher
Attorney, Agent, or Firm—Biebel, French & Nauman

[57] ABSTRACT

A profile measuring apparatus is used to detect and record the variations in profile of a substantially planar surface and consists of a frame, front and rear rollers mounted to the frame, a follower rotatably mounted to the frame and extending outwardly between the front and rear rollers so that it may rotate from the frame at least as far as the rollers, a lever rotatably mounted to the frame and responsive to the rotating of the follower, a support mounted to the frame to which the lever is rotatably mounted, and a recording apparatus for measuring the movement of the lever thereby recording the rotation of the follower. The recording apparatus consists of a coiled strip of paper which is uncoiled by rollers which are driven by a sprocket linkage connected to an axle of the front rollers, and a stylus which engages the chart paper and is mounted on an end of the lever such that deflection of the follower causes the stylus to move relative to the coil of chart paper to discribe a trace thereon. The profile measuring apparatus is hand-held and is moved across the surface such that the follower is raised or lowered as the distance from the surface to the frame changes between the front and rear rollers and a trace is generated which reflects the changes.

21 Claims, 11 Drawing Figures

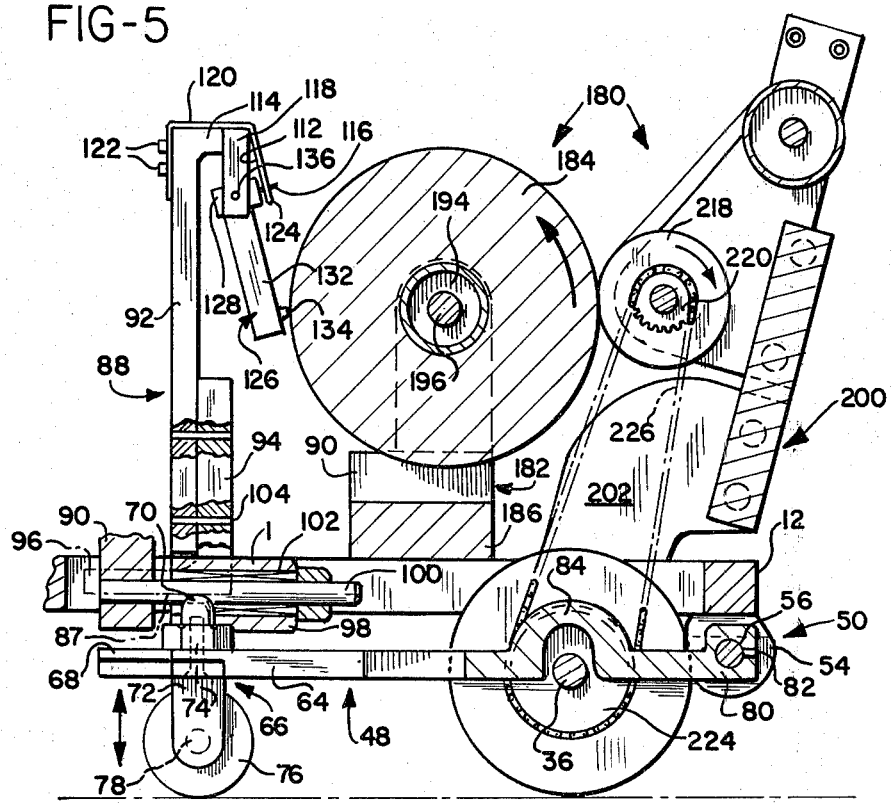
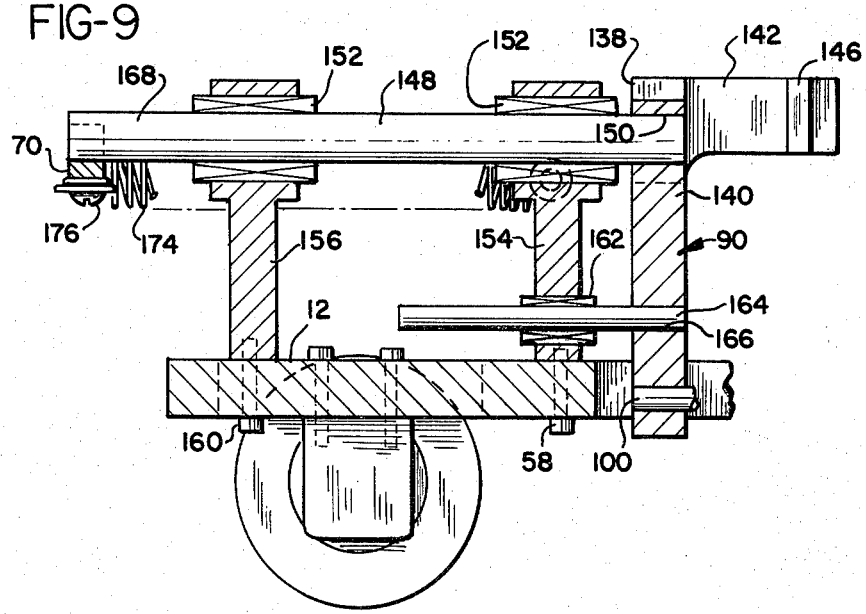

DIRECTION OF STRIP TRAVEL

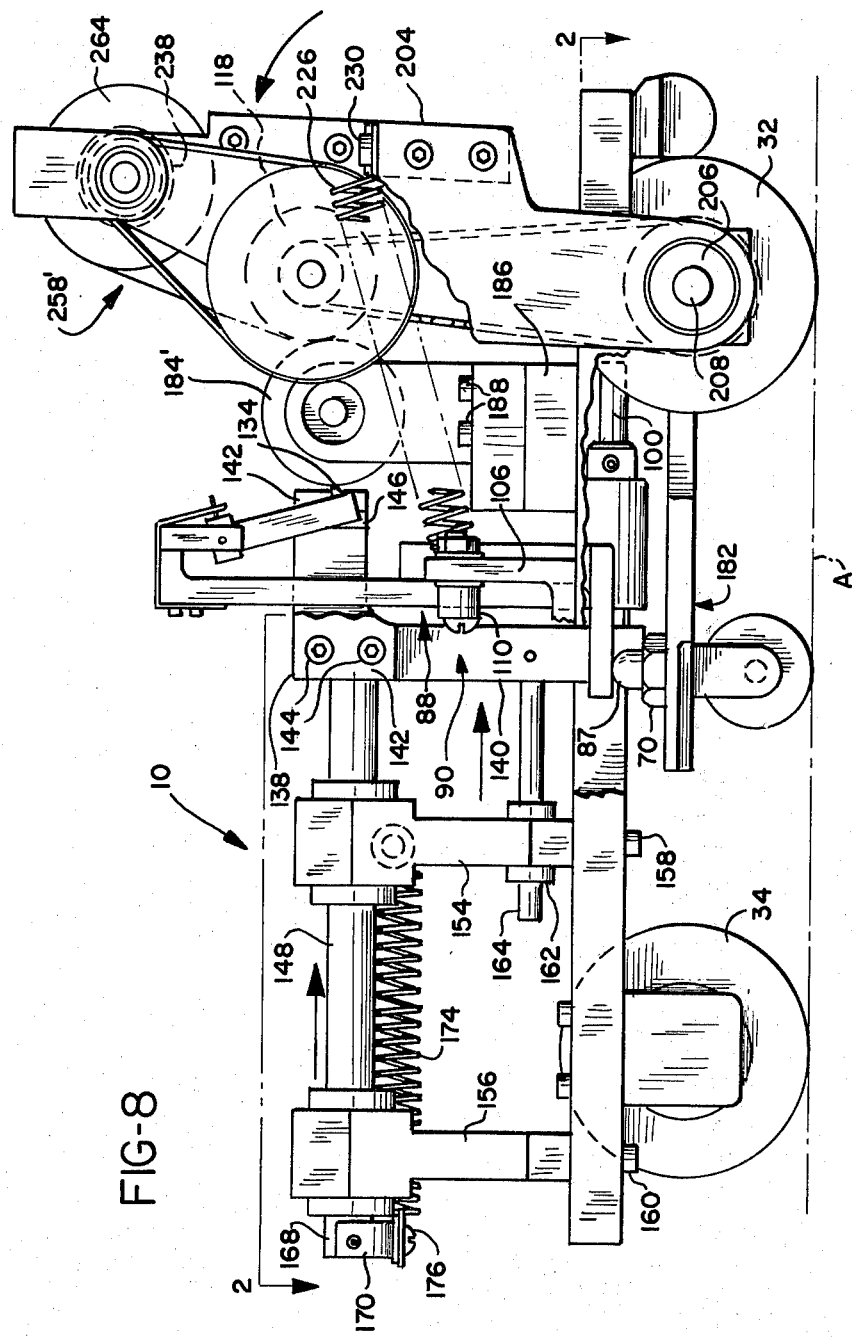

SURFACE PROFILE RECORDER

BACKGROUND OF THE INVENTION

1. Field of the Invention

The present invention relates to instruments for indicating or recording the sizes and shapes of irregularities on a surface, and, more particularly, to hand-held and portable instruments for measuring surface irregularities.

2. Prior Art

In many manufacturing operations, it is often necessary to determine the contour or profile of the finished product. For example, in paper making operations, it is necessary to determine the amplitude and location of ridges and wavy surfaces that appear on the surface of a coiled web of paper. The data regarding the surface irregularities is useful as the paper is processed through various steps to the final product, such as coating, calendering, rewinding, and cutting.

One example of such an instrument is disclosed in U.S. Pat. No. 3,540,270. This device determines reel hardness, or the resiliency of a surface of a reel, and consists of a frame having front and rear rollers, a wheel which is rotatably mounted to a yoke extending from a spring arm mounted intermediate the rollers, and a series of protrusions extending from the periphery of the wheel. As the device is moved along the surface of a coiled web of paper, the protrusions on the wheel engage and deflect the surface of the paper and cause the wheel to deflect away from the paper thereby activating a recording device, such as an accelerometer, which generates a signal recorded on a chart recorder to give a continuous trace. This device measures the hardness of a coiled web of paper by measuring the penetration of the protrusions on the wheel into the surface of the web. The wheel is urged toward the web by a coil spring and the entire frame is held against the coil by a boom extending upwardly from a carriage mounted to travel in a direction which is parallel to the central axis of the coiled web.

This device has several disadvantages. For example, the device must be urged against the surface to be measured so that the spring holding the wheel against the surface may be properly deflected. This requires the use of a boom and a carriage which add to the cost of the device and impair its portability. In addition, the proximity of the wheel to the front rollers reduces the ability of the device to measure variations in surface profile. Since the wheel is virtually co-axial with one of the rollers, it cannot measure the differences in distances from the frame to the surface because that distance is maintained constant at the rollers.

Another disadvantage lies in the recording mechanism used for the device. The device requires sophisticated electronic equipment, such as accelerometers, which generate a signal sent to a chart recorder which generates a trace. This significantly adds to the cost and complexity of the mechanism and also reduces its portability.

Accordingly, there is a need for a surface profile recorder which is portable and preferably hand-held, inexpensive to manufacture, and has a self-contained recording apparatus that can generate a trace indicating the irregularities of the surface measured without need of sophisticated electronic apparatus.

SUMMARY OF THE INVENTION

The present invention provides a surface profile recorder which is small enough to be hand-held and is therefore extremely portable. The recorder does not require additional structure to hold it against the surface being measured, nor does it require an additional carriage to cause it to move across the surface. In addition, the measuring apparatus which records the surface irregularities is entirely self-contained within the recorder so there is no need for additional equipment located remotely from the recorder.

The surface profile recorder of the present invention consists of a substantially rectangular frame, front and rear rollers rotatably mounted to the underside of the frame, a follower which is rotatably mounted to the underside of the frame between the front and rear rollers so that it may rotate away from the frame below the rollers to engage the surface to be measured, a support bracket slidably mounted to the frame, a lever rotatably mounted to the support and responsive to the rotation of the follower, and a recording device for recording movement of the follower and lever. The recording device preferably consists of a roll of chart paper which is mounted on an axle rotatably supported by pillow blocks supported on the frame, and a stylus mounted to the lever so that it may engage the coil and generate a trace upon the web as the lever is displaced by the follower.

The recording device also includes an uncoiling device which consists of a yoke rotatably mounted to the frame, and uncoiler axle rotatably mounted to the yoke, and a pair of uncoiler rollers which are mounted to the uncoiler axle and engage the outer surface of the roll of paper. The uncoiler axle includes a sprocket which is joined to a second sprocket mounted on an axle of the front rollers by a sprocket chain such that movement of the front rollers causes rotation of the uncoiler rollers. The relative sizes of the uncoiler rollers and sprockets is such that rotation of the front rollers a given distance will cause the coiled roll of paper to uncoil the same distance. Thus, the trace generated by the apparatus corresponds exactly in length to the length of surface traversed by the rollers. In addition, since the rollers engage the roll at the outer surface, the rate at which a strip of paper is played out from it will be at a constant ratio to the rotation of the uncoiler rollers, even as the diameter of the roll decreases.

The recorder also includes a device for taking up the chart paper after it has engaged the stylus. This includes a recoiler axle which is rotatably mounted to the yoke, and a slip belt unit which extends from the uncoiler axle to the recoiler axle. The slip belt unit includes a pair of pulleys, mounted on the uncoiler and recoiler axles, and a resilient belt which fits over the pulleys. Thus, rotation of the uncoiler axle by the sprocket assembly causes rotation of the recoiler axle, thereby coiling the paper about the recoiler axle as it is uncoiled from the coiled web. When the apparatus is used, paper will be played off of the roll onto the recoiler axle.

As the diameter of the roll of recoiled paper upon the recoiler axle increases, and the diameter of the roll of unused paper on the uncoiler axle decreases, the rate at which the paper is taken up by the recoiler increases and may exceed the rate at which the paper is being uncoiled. The slip belt unit permits the rate of take up of the recoiler axle to be held to the rate at which the roll is being uncoiled by allowing the pulley mounted on the recoiler axle to slip with respect to the travel of the belt and pulley on the uncoiler axle. Preferably, the pulleys are sized such that the rate of take up would at all times exceed the rate of play out of strip paper were it not for the slippage of the pulley on the recoiler axle. Thus, the strip between the uncoiling and recoiling rolls is maintained taut at all times.

The yoke of the uncoiling device also includes a coil spring which extends between the yoke and a bracket mounted to the frame. This spring causes the yoke to rotate toward the roll so that the uncoiler rollers at all times engage the roll during operation as the uncoiling roll decreases in diameter. The yoke and spring combination allow the strip of paper to be uncoiled by the uncoiler rollers from the roll at a constant rate as previously discussed, even as the roll decreases in size during use. The combination also facilitates replacement of the roll, since the yoke may be tilted back by hand to disengage the uncoiler rollers from the roll.

Preferably, the follower consists of a follower arm rotatably mounted at an end to the frame at a point proximate the front rollers, and extending to a point intermediate the front and rear rollers, a rounded lug attached to the follower arm at an end and extending upward toward the frame, and a follower wheel rotatably mounted to the follower arm beneath the lug. The lever preferably consists of a lever bearing which is rotatably mounted to the support bracket, a first arm extending outwardly from the bearing and terminating in a substantially flat bearing surface positioned above the lug of the follower arm, and a second arm extending from the lever bearing in a direction substantially normal to the first arm and terminating in a bracket to receive the stylus of the recording device. The lever also includes a coil spring which extends between the second arm and a bracket mounted to the frame to urge the lever into engagement with the lug of the follower arm.

The support bracket which supports the lever preferably is slidably mounted to the frame of the measuring apparatus and includes a pair of pedestals mounted on the frame and extending upwardly therefrom, each pedestal having a ball bushing mounted therein, and a main shaft slidably supported in the ball bushings and positioned substantially normal to the uncoiler axle. The support bracket is attached at a forward end of the main shaft proximate the roll of paper. The support bracket also includes a coil spring which extends from a pedestal to a rearward end of the main shaft which thereby urges the support bracket toward the roll so that the stylus mounted on the lever may engage the roll. The support bracket may include a second shaft which is mounted in the support bracket and extends toward the pedestals to slidably engage an adjacent pedestal in a ball bushing. The second shaft prevents the rotation of the support bracket about the main shaft.

The lever preferably is L-shaped and includes a cylindrical pivot rotatably mounted to a shaft press fitted to the support bracket, a stylus support member extending upwardly from the pivot, and a bearing engaging member extending outwardly from the pivot over the follower and positioned normal to the stylus support member. The bearing engaging member includes a flat, elongated bearing surface for engaging the lug of the follower. The bearing surface is elongated so that it may engage the lug at all times during use, as the bracket urges the lever toward the roll to compensate for its decreasing diameter as strip is played out. The lever also includes a coil spring which is attached to the stylus support member and extends to a post mounted to the side of the frame adjacent the bearing engaging member. The spring urges the lever to rotate so that the bearing engaging member maintains contact with the lug of the follower.

The support bracket may also include a pair of stops which extend outwardly from the bracket toward the coiled web of paper and serve to constrain the rotational movement of the lever such that rotation of the lever beyond a predetermined point, either clockwise or counterclockwise, will cause the first arm which carries the stylus to hit a stop. The stops are positioned such that the stylus is able to travel the full width of the roll of paper.

The apparatus of the present invention also includes a handle structure which extends from the frame above the pedestals and support bracket. The handle preferably is cylindrical and extends in a direction parallel to the intended direction of travel of the apparatus.

In operation, the recorder is positioned so that the front and rear rollers engage the surface to be measured. The wheel of the follower also engages the surface since the follower arm is caused to rotate away from the frame toward the surface either by gravity or by the action of the spring mounted on the lever. The roll of paper is uncoiled such that the leading edge of the strip forming the roll is attached to the recoiler axle and further rotation of the uncoiler and recoiler axles will cause the strip to be recoiled about the recoiler axle. The support bracket is permitted to move toward the coiled web of materials so that the stylus may engage the surface of the web.

As the recorder is moved along the surface to be measured, the rotation of the axle of the front rollers causes the coiled web of paper to be uncoiled past the stylus and recoiled onto the recoiler axle. When the apparatus encounters a depression or elevated portion of the surface between the front and rear rollers, the follower wheel is raised or lowered thereby causing the lever to rotate about the lever bearing and the stylus to move relative to the coiled web of paper. The resultant trace records the depression or elevation in the surface. Thus, the measuring apparatus measures and records the variation in surface profile by responding to the variation in the distance between the frame and the surface at a point intermediate the front and rear rollers. Since the axles of the front and rear rollers are fixed relative to the frame, the distance between the frame and surface at each of these points is constant and provides a datum. The follower and recording mechanism actually measures the variation in distance from the frame above or below these two data at a point between the two data.

After the surface has been measured, the recoiled strip of paper may be separated from the roll still coiled and removed from the apparatus. To facilitate removal of the recoiled roll, as well as the replacement of a fresh roll, both rolls preferably are mounted on pins which slidably engage bearings in the pillow blocks and yoke respectively, which may be removed or reinserted by grasping a knurled knob attached to the end of each pin.

Accordingly, it is an object of the present invention to provide a surface profile recorder which is portable and may be hand-held in use; to provide a recorder which is relatively inexpensive to manufacture in that it does not require sophisticated electronic recording devices; to provide a recorder which is entirely self-contained and does not require external apparatus to generate a trace; and to provide a recorder which is rugged and dependable.

Other objects and advantages of the invention will be apparent from the following description, the accompanying drawings, and the appended claims.

BRIEF DESCRIPTION OF THE DRAWINGS

FIG. 5 is a partial side elevation of the recorder shown in FIG. 1, showing the recording device in section;

FIG. 8 is a side elevation of the recorder shown in FIG. 7, in which the yoke is partially broken away to reveal the sprocket chain, and in which the coil of paper has been substantially uncoiled and recoiled onto a take up sleeve;

FIG. 9 is a partial side elevation of the frame and pedestals for supporting the support bracket of the recorder of FIG. 1, taken in section;

DETAILED DESCRIPTION OF THE PREFERRED EMBODIMENT

Figure 1:
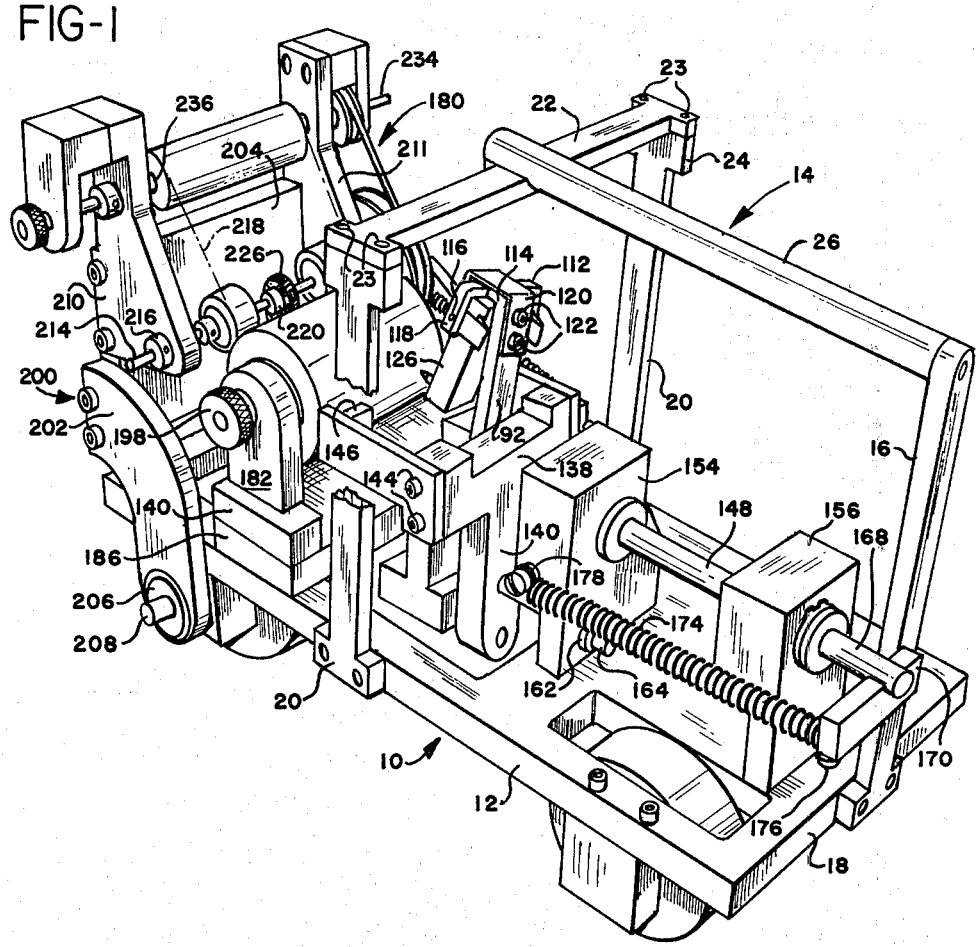
FIG. 1 is a perspective view of a preferred embodiment of the surface profile recorder of the present invention.

As shown in FIG. 1, the profile measuring apparatus of the present invention, generally designated 10, includes a frame 12 to which is mounted a handle assembly 14. Handle assembly 14 includes a rear strut 16, mounted by screws (not shown) to the rearward end 18 of the frame 12, and side struts 20, mounted by screws (not shown) to the sides of the frame midway along its length. The side struts 20 are joined by a cross bar 22, mounted by screws 23 to a flared top end 24 of each side strut. The cross bar 22 and rear strut 16 are joined by a knurled handle 26, sized to be grasped by the hand of a user. The knurled handle 26 preferably is screwed to the cross bar 22 and rear struts 16.

Figure 2:
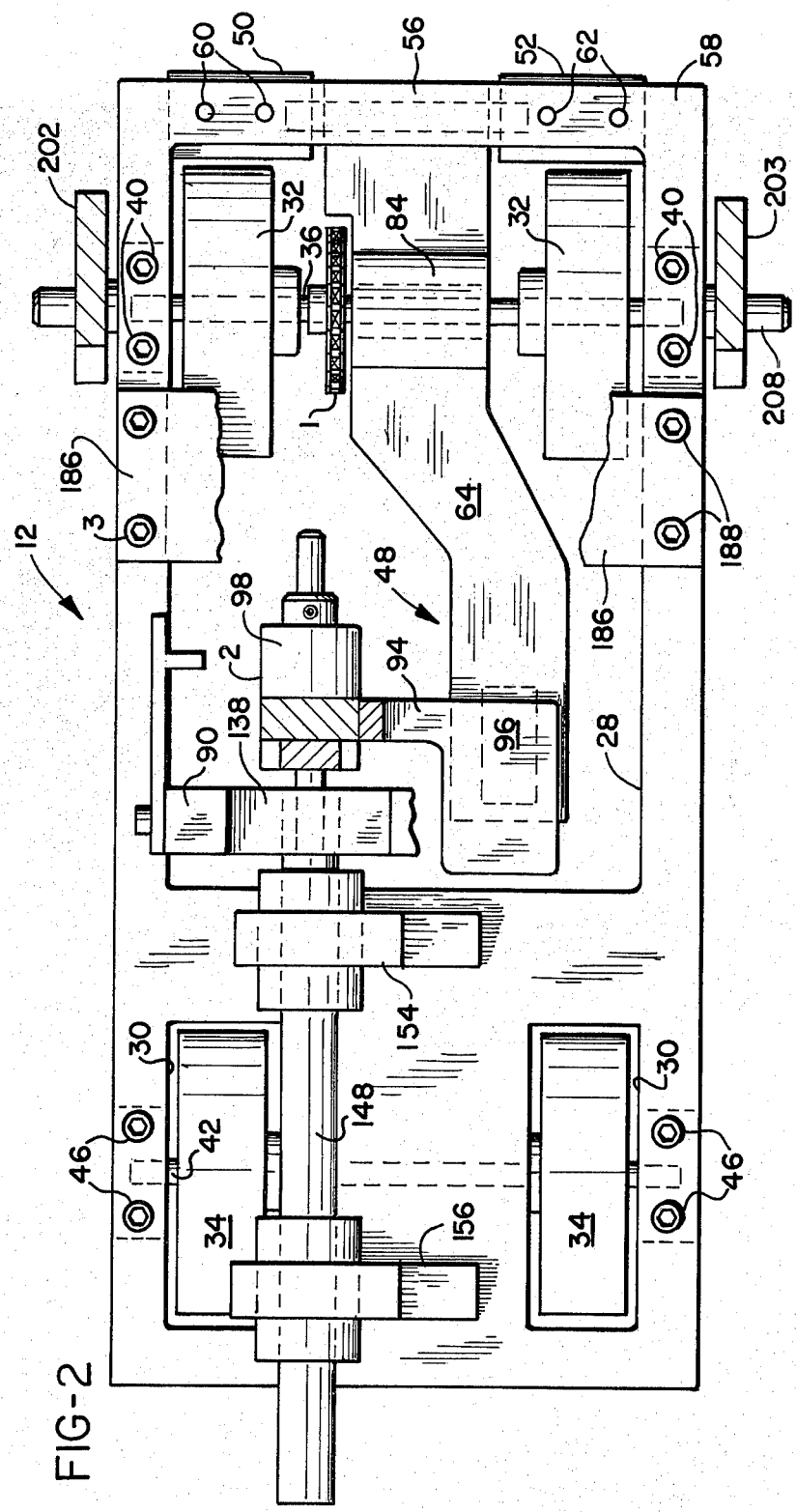
FIG. 2 is a plan view of the recorder shown in FIG. 1, partially roken away to reveal the follower.
Figure 3:
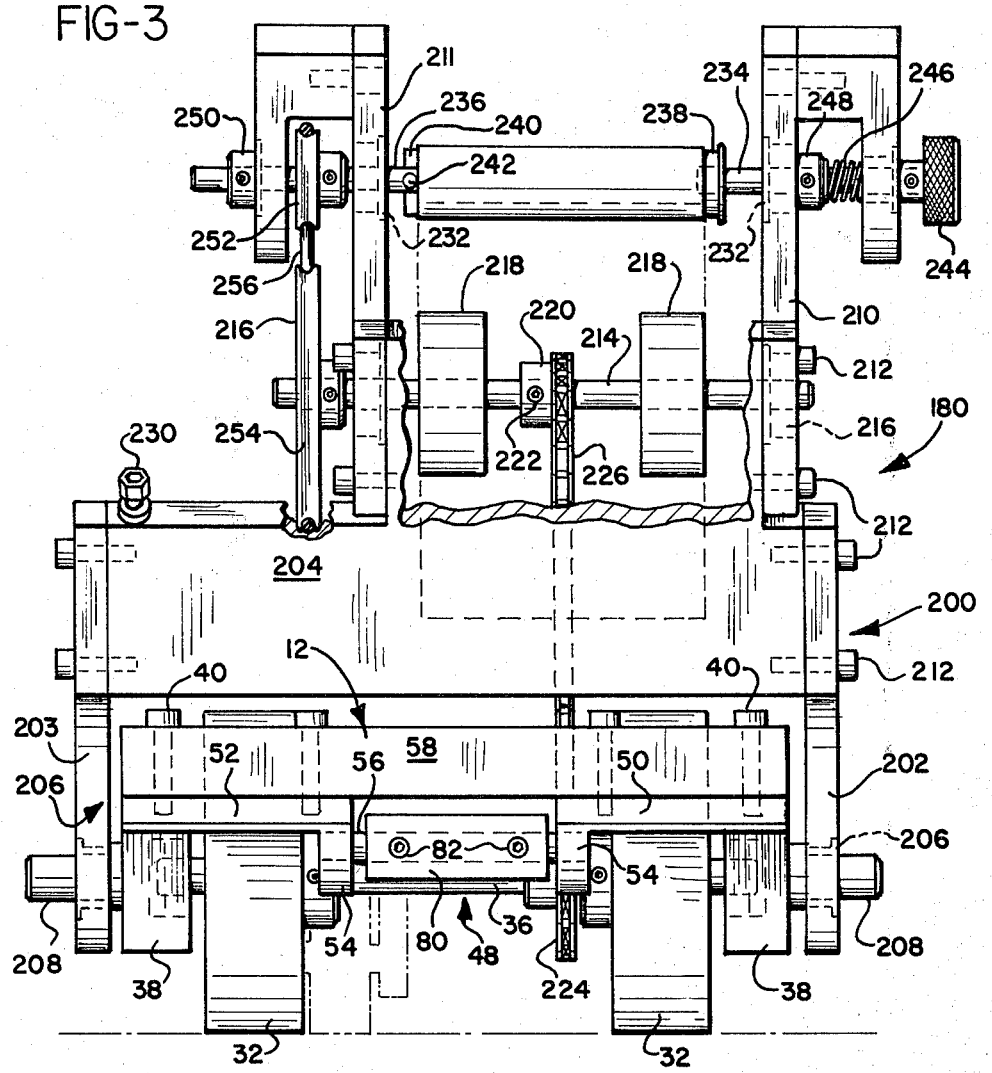
FIG. 3 is an end elevation of the recorder, taken at line 3—3 of FIG. 7, and in which the central panel has been partially broken away to reveal the uncoiler rollers.

As best shown in FIG. 2, the frame 12 preferably is rectangular in shape and includes a large forward opening 28 and two smaller rearward openings 30. The frame 12 is supported by a pair of front rollers 32 and a pair of rear rollers 34, all of which are mounted to the underside of the frame. As shown in FIGS. 2 and 3, the front rollers 32 are each fixedly mounted to an axle 36, the ends of which are fitted into pillow block bearings 38 which are mounted to the underside of the frame 12 by screws 40.

Figure 4:
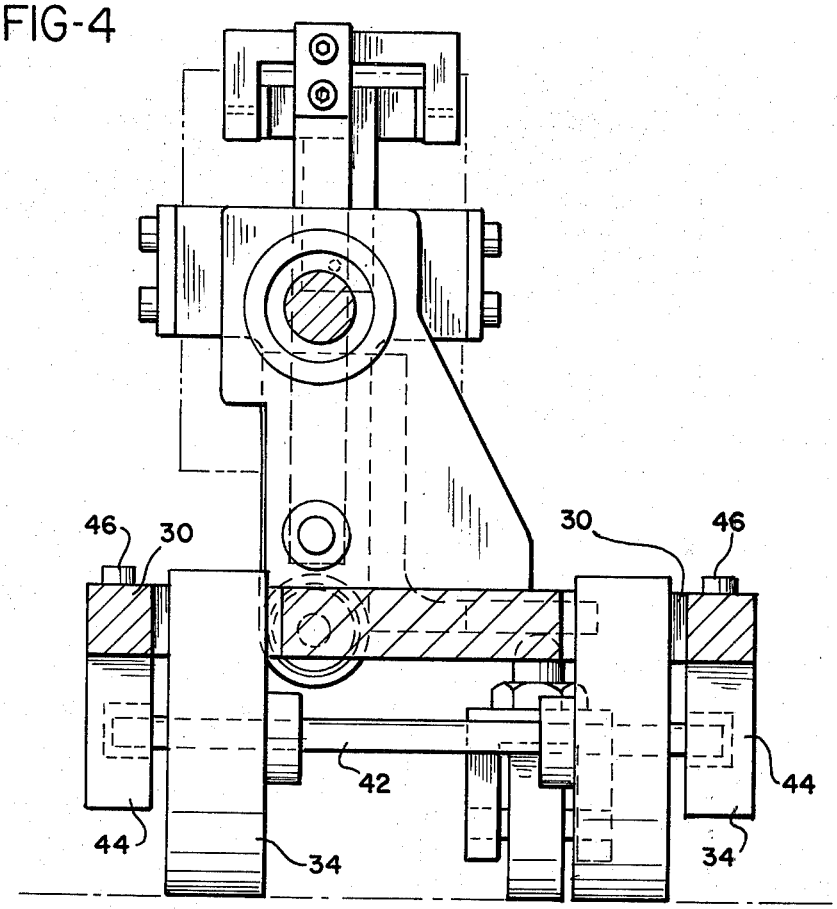
FIG. 4 is an end elevation of the recorder taken at line 4—4 of FIG. 7, in which the roll is shown in phantom and a portion of the lever obscured by the pedestals is also shown in phantom.

Similarly, as shown in FIGS. 2 and 4, the rear rollers 34 are fixedly mounted to a rear axle 42, the ends of which are held in rear pillow block bearings 44. Rear pillow block bearings 44 are mounted to the underside of the frame 12 by socket screws 46.

As shown in FIGS. 2, 3, and 5, a follower 48 is rotatably mounted to a pair of follower brackets 50, 52. Follower brackets 50, 52 are generally L-shaped and include follower pillow block bearings 54. Extending between the follower pillow block bearings 54 is a follower axle 56 which is freely rotatable therein. The follower brackets 50, 52 are mounted to the underside of the forward end 58 of the frame 12 by pairs of machine screws 60, 62.

The follower 48 includes a follower arm 64, a follower wheel assembly 66 mounted to the underside of a rearward end 68 of the follower arm, and a lug 70 mounted above the follower wheel assembly on the follower arm. The follower wheel assembly 66 consists of a U-shaped fork 72 which is mounted to the follower arms 64 by a flat head machine screw 74 that extends through an upper portion of the fork, an opening in the rearward end 68 of the follower arms, and into a threaded opening in the lug 70. Thus, the screw clamps the end 68 between the lug 70 and fork 72. The fork 72 supports a follower wheel 76 which is fixedly mounted to an axle 78 which in turn is rotatably mounted into the fork 72 by bearings (not shown).

Figure 6:
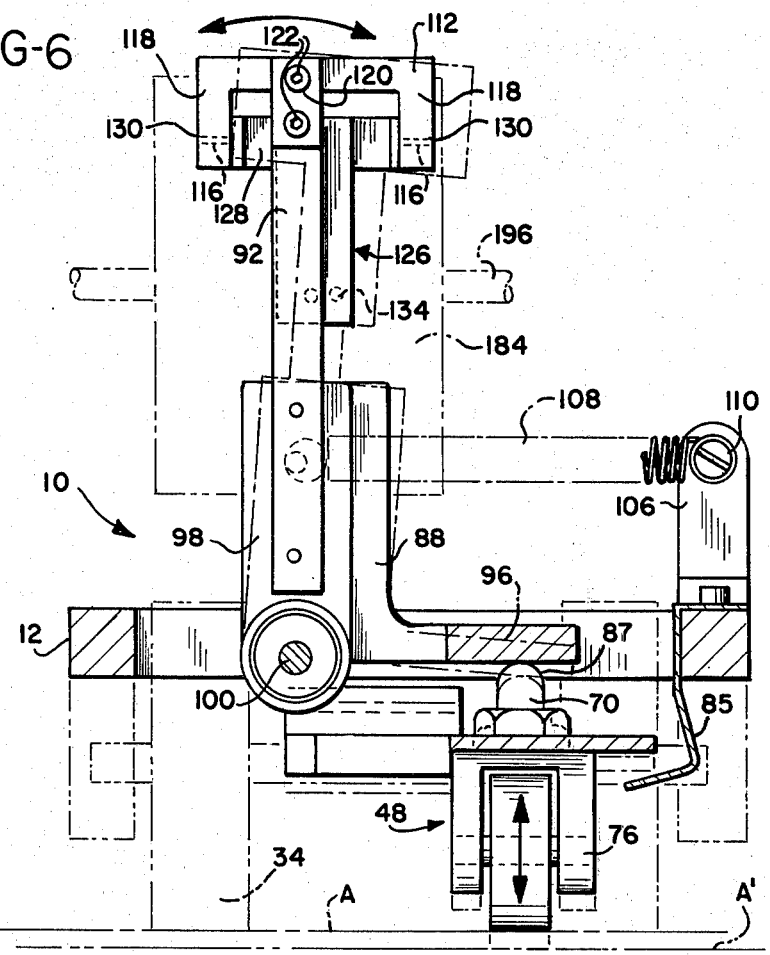
FIG. 6 is an end elevation of the recorder, taken at line 6—6 of FIG. 7, showing the follower and lever arrangement, and showing in phantom the rotation of the lever and the vertical movement of the follower wheel.

The follower arm 64 is mounted to the follower axle 56 at a front portion 80. The front portion 80 is prevented from sliding along the follower axle 56 by set screws 82 which are threaded into the front portion 80 and abut the follower axle. The follower arm 64 includes a U-shaped section 84 which provides a clearance around the front axle 36. The U-shaped section 84 preferably is deep enough so that the axle 36 will not interfere with the rotation of the follower 48 about the follower axle 56 in a normal range of movement. As shown in FIG. 6, an L-shaped follower bracket 85 is attached to the frame 12 by a screw 86 and prevents the arm 64 from rotating greater than a predetermined distance from the frame.

As shown in FIGS. 5, 6, 7, and 8, the lug 70 includes a rounded bearing surface 87 which engages an L-shaped lever 88 which is rotatably mounted to a support bracket 90. The lever 88 includes an upright stylus support member 92 and a bearing engaging member 94 which has an elongated, planar bearing surface 96 that engages the bearing surface 87 of the lug 70. The bearing engaging member 94 and the stylus support member 92 both are mounted to and extend from a cylindrical pivot 98 which rotatably engages a shaft 100. Shaft 100 is press-fitted into a lower portion of the support bracket 90. Pivot 98 includes a pair of bearings 102 which engage the shaft 100 to promote the free rotation of the pivot about the shaft. The bearing engaging member 94 and stylus support member 92 may be fastened by the pivot 98 by conventional means such as screws 104.

Figure 7:
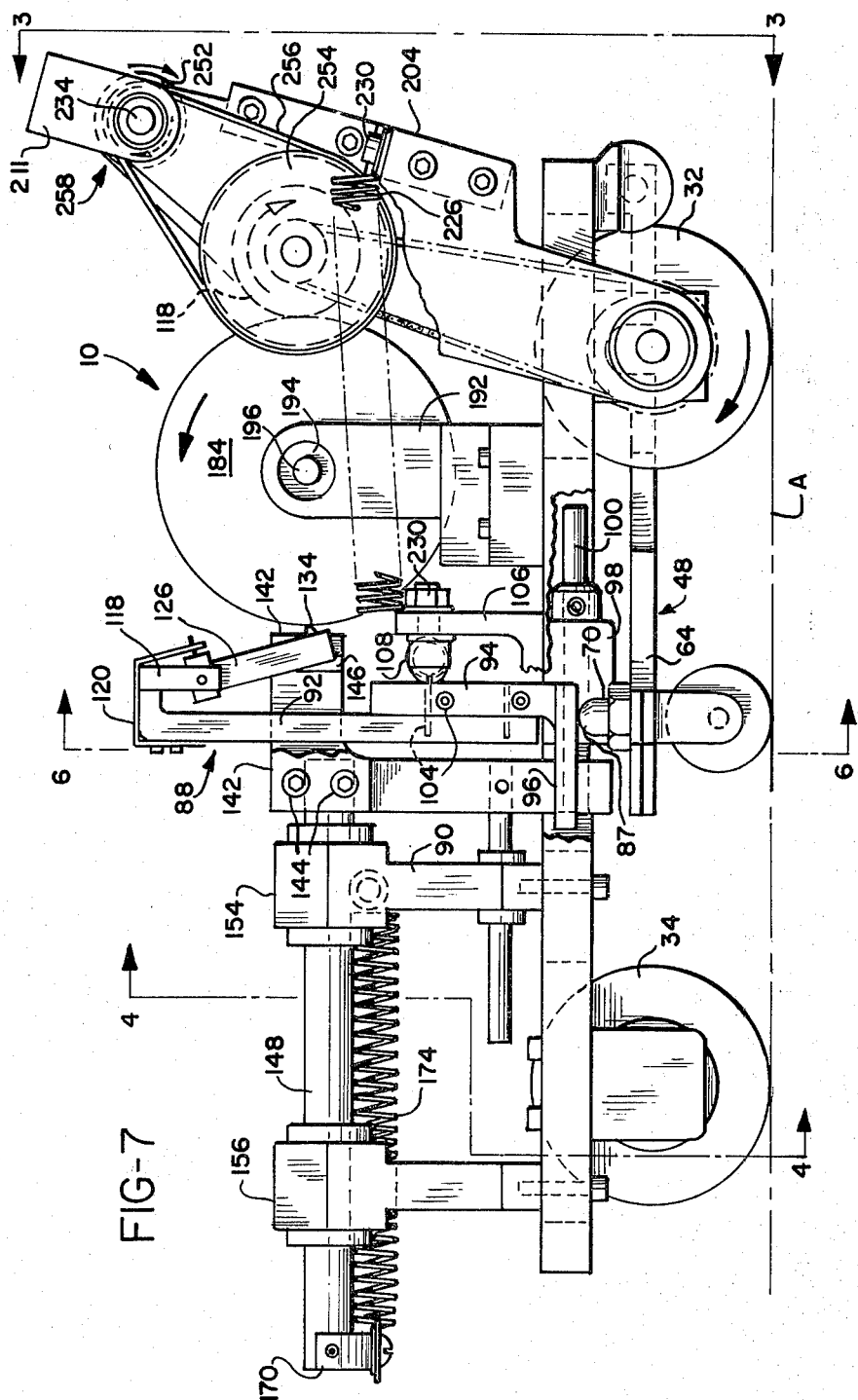
FIG. 7 is a side elevation of the recorder shown in FIG. 1, in which the yoke is partially broken away to reveal the sprocket chain joining the drive sprocket and driven sprocket, and in which the roll of paper is shown substantially coiled.

As best shown in FIGS. 6, 7, and 8, the frame 12 includes a post 106 which supports a coil spring 108. Coil spring 108 extends to the lever 88 and is attached thereto by a screw or other conventional means (not shown). The coil spring 108 preferably is attached to the post 106 by a conventional means such as a screw and washer combination 110. The coil spring 108 serves to urge the lever 88 to rotate in a clockwise direction (shown in FIG. 6) so that the bearing surface 96 is held in contact with the bearing surface 87 of the lug 70 on the lever arm follower 48.

As best shown in FIGS. 1, 5, and 6, the lever 88 includes a stylus fork 112 which is mounted to a leg 114 of the stylus support member 92, preferably by screws (not shown). The stylus fork 112 includes transverse holes 116, formed in downturned arms 118 of the leg. A U-shaped stylus support bracket 120 is fastened to the stylus support member 192 by machine screws 122. Stylus support bracket 120 terminates in a tongue 124 having an opening (not shown).

Stylus 126 includes cross members 128 having lugs 130 fitting into holes 116 such that the stylus can rotate about the lugs. The stylus 126 includes an ink reservoir 132 and a tip 134, preferably made of felt. The cross members 128 include a prong 136 which extends through the hole of the tongue 124. Stylus support bracket 120 preferably is made of a resilient spring steel such that the engagement of the prong 136 with the support bracket 120 permits the stylus 126 to be held resiliently outward away from the stylus support member 92, yet permitted to rotate backward toward the support member.

As shown in FIGS. 1, 7, 8, and 9, the shaft 100 which supports the lever 88 is press-fitted into a support bracket 90. Support bracket 90 is T-shaped in general, having a horizontally oriented top member 138 and a vertically oriented lower member 140. The top member 138 includes a pair of opposing stops 142 extending forwardly therefrom, and mounted to the top member by screws 144. Each stop 142 is generally flat in shape and includes an inwardly extending lug 146. The stops 142 constrain the rotation of the lever 88 about the shaft 100 by providing a surface against which the stylus support member 92 may abut. Thus, if the apparatus 10 should be picked up away from a surface on which it is resting, the follower 48 would drop down until the arm engaged the follower bracket, permitting the coiled spring 108 to urge the lever 88 about shaft 100. The presence of stops 142 would prevent the lever 88 from rotating too far in this situation, thereby preventing possible damage to the stylus 126 or stylus tip 134.

As best shown in FIGS. 1, 2, 7, 8, and 9, the support bracket 90 receives a main shaft 148 which is press-fitted into an opening 150 formed in the top member 138. The main shaft 148 extends through conventional ball bushings 152 which are mounted in pedestals 154, 156. Pedestals 154, 156 are mounted to the frame 12 by conventional means such as screws 158, 160. Pedestal 154 also includes a ball bushing 162 in a lower portion which receives a secondary shaft 164 press-fitted into an opening 166 formed within the lower member 140 of the support bracket 90.

The rearward end 168 of the main shaft 148 is fitted with a clamp 170. Clamp 170 is retained on the end 168 by a set screw 172. Clamp 170 is generally rectangular in shape and extends outwardly away from the main shaft 148 past the pedestals 154, 156. A coil spring 174 is mounted to the outward end of the clamp 170 by means of a screw and washer combination 176 which may also serve to hold the clamp to the shaft. An opposite end of the coiled spring 174 is attached to a side of the pedestal 154 by means of a second screw and washer combination 178 tapped into the pedestal. The spring 174 is sized such that the main shaft 148 is urged forward and the stylus 126 mounted on the lever 88 may engage a recording device, generally designated 180.

As shown in FIGS. 1, 5, and 7, the recording device 180 includes a roll supporting assembly 182 which is suitable for supporting a coiled roll of paper 184. The roll support assembly 182 includes a cross panel 186, mounted across the forward opening (shown in FIG. 2) and secured to the frame 12 by screws 188. One pair of screws 188 preferably are threaded into the panel 186 from above, as shown in the lower portion of FIG. 2, and a second pair of screws 188 are threaded into panel 186 from beneath the frame 12, shown in the upper portion of FIG. 2.

Pillow blocks 190, 192 are mounted on cross panel 186 and are retained thereon by screws 188. Pillow blocks 190, 192 each define bearings 194 which receive an axle 196 having a knurled knob 198 press-fitted onto its end. Axle 196 is retained by bearings 194 in an interference fit such that it may easily be removed therefrom by a user who grasps the knob 198 and pulls the axle outward away from pillow blocks 190, 192. Axle 196 supports the roll 184 of paper and may include a sleeve (not shown) extending between pillow blocks 190, 192 which acts as a base for the roll, or the roll itself may include a central wooden or paper sleeve sized to receive the axle.

As shown in FIGS. 1, 3, and 5, the recording device 180 also includes a yoke 200 which is rotatably mounted to pillow blocks 38 beneath the frame 12. Yoke 200 includes two opposing arcuate arms 202, 203 joined by a central panel 204. Arcuate arms 202, 203 each include a bearing 206 which receives a pin 208 press-fitted into the pillow blocks 38. The pins 208 are held within the bearings 206 by an interference fit.

An upper portion of the central panel 204 supports a pair of opposing take up brackets 210, 211. Take up brackets 210, 211, as well as arcuate arms 202, 203, are mounted to the central panel 204 by machine screws 212. A lower portion of take up brackets 210 supports a drive axle 214, mounted within bearings 216. Mounted on drive axle 214 are a pair of uncoiler rollers 218. Uncoiler rollers 218 are fixedly mounted to drive axle 214 by set screws (not shown) so that they will not rotate relative to the drive axle. A driven sprocket 220 is mounted on drive axle 214 and fixed with respect to the drive axle by a set screw 222.

As shown in FIGS. 2 and 3, a driving sprocket 224 is fixedly mounted on the front axle 36 and is mechanially linked to the driven sprocket 220 by a sprocket chain 226. Thus, as front rollers 32 are rotated, drive sprocket 224 drives the driven sprocket 220, thereby rotating drive axle 214 and uncoiler rollers 218. As shown in FIG. 5, uncoiler rollers 218 engage a roll 184 of paper and rotate it as the front rollers 32 are rotated. In order to maintain the uncoiler rollers 218 in engagement with roll 184 of paper during operation, the yoke 200 is urged in a counterclockwise direction of rotation, as shown in FIG. 5, by means of a coil spring 228, shown in FIGS. 7 and 8 and mounted to the central panel 204 and the post 106 by screw and washer combinations 230.

As shown in FIGS. 1, 3, and 7, the take up brackets 210, 211 include bearings 232 which receive take up axles 234, 236. Extending between take up axles 234, 236 is a recoiler sleeve 238. Recoiler sleeve 238 includes a notched end 240 which receives a pin 242 extending through take up axle 236. Take up axle 234 extends through bearing 232 and terminates in a knurled knob 244.

In a U-shaped portion of take up bracket 210, a coil spring is positioned about the axle 234 and urges against a fixed collar 248 on the axle. Thus, the knurled knob 244 may be grasped and displaced to the right (as shown in FIG. 3) to disengage the take up sleeve 238, then released. The spring 246 urges the fixed collar 248 to the left, thereby returning the axle 234 to its original position. This facilitates the attachment and removal of the take up sleeve 238 from the recording device 180.

Similarly, take up bracket 211 includes a U-shaped portion which receives take up axle 236. Take up axle 236 is held within bearing 232 by an interference fit and by fixed collar 250 mounted on an exterior end of the axle. The take up axle 236 also includes a driven pulley 252 which is fixedly mounted to the axle. Drive axle 214 includes a driving pulley 254 which is fixedly mounted to an external end of the axle and positioned directly beneath the driven pulley 252. Driven pulley 252 and driving pulley 254 are linked by an elastic slip belt 256. Thus, as drive axle 214 is rotated by the sprocket and chain drive linked to the front axle 36, drive pulley 254 drives driven pulley 252 thereby rotating take up axles 234, 236 and take up sleeve 238. The direction of rotation is the same as that of the drive axle 214.

The operation of the surface profile recorder 10 is as follows. Prior to operation, the recorder 10 is first loaded with an unmarked roll of paper 184, as shown in FIGS. 1 and 7. This is accomplished by removing the axle 196 by grasping the knurled knob 198 and pulling outwardly away from the pillow block 190. The roll 184 is placed between pillow blocks 190, 192, and the axle 196 is reinserted into the pillow blocks. At the same time, the support bracket 90 is urged away from the recording device 180 so that the stylus 126 does not engage the roll prematurely. The stylus 126 and support bracket 90 may be maintained in a spaced apart relationship away from the roll 184 by placing a suitable spacer (not shown) in between the clamp 170 on the end of the main shaft 148, and the pedestal 156. The clip may simply be U-shaped and fabricated from sheet metal. The clip will be held between the clamp 170 and pedestal 156 by the compressive forces of the coil spring 174.

After the roll 184 has been mounted on the roll support assembly 182, a strip 258 is unraveled from it and attached to the take up sleeve 238. This may be done in any conventional manner, preferably by coiling the strip 258 over itself about the take up sleeve 238. It should be noted that, due to the rotation of the roll 184 and take up sleeve 238, the roller should be mounted on the support assembly 182 such that the strip is uncoiled from the underside of the roll and is recoiled onto the sleeve over the top of the sleeve.

After the roll 184 has been mounted on the recorder 10 and the strip 258 attached to the take up sleeve 238, the clip may be removed from between the clamp 170 and pedestal 156, thereby permitting the main shaft 148 to be displaced toward the roll thereby engaging the take up 134 of the stylus 126 with the outer surface of the roll.

Preferably, this loading operation is performed while the recorder 10 is resting upon the surface whose profile is to be measured, shown as the broken line A in FIGS. 6, 7, and 8. However, the loading and threading process previously described may be performed at any location, provided that the stylus is prevented from engaging the roll prior to the placement of the recorder on the surface A.

Figure 10:
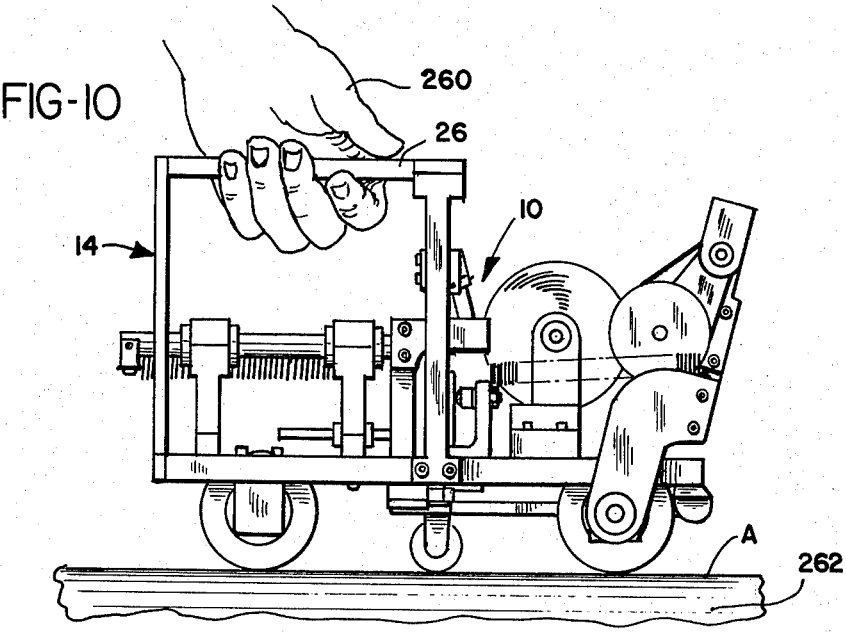
FIG. 10 shows the recorder of FIG. 1 in use and held in the hand of a user.

As shown in FIG. 10, the recorder 10 may easily be grasped in the hand of a user 260 and held on the top surface A of a coiled web 262 of paper, for example. The user 260 merely grasps the recorder 10 by the knurled handle 26 of the handle assembly 14 to hold the recorder in position on the surface A. During use, the recording apparatus 10 is moved by the user in a direction that would be from left to right, as the recorder is shown in FIG. 10.

To mark the strip 258 by the stylus 126 initially, the rear rollers 34 are raised away from the surface A and the recorder 10 is rotated about the front axle. This causes the follower 48 to rotate away from the frame 12 thereby permitting the lever 88 to rotate about the shaft 100 causing the stylus tip 134 to move with respect to the strip 258. The resultant mark, shown as line B, B', on the strip 258' of FIG. 11, denotes a starting point for a recorded profile. Line segment B is caused by the movement of the stylus in response to the recorder 10 being tilted upwardly, and line segment B' is caused by the movement of the stylus as the recorder is moved downwardly so that the rear rollers 34 again contact surface A.

Figure 11:
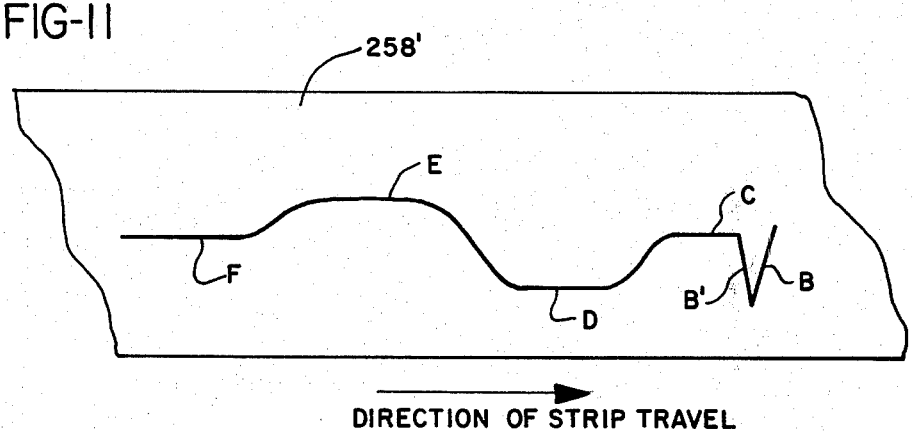
FIG. 11 shows a sample trace generated by the recorder of FIG. 1 on a strip of paper.

The user then begins to move the recorder 10 along the surface A to be recorded. As best shown in FIG. 6, the position of the stylus support member 92 is substantially vertical when the follower 48 is resting on a surface A which is level between the front and rear rollers. As the roll 184 rotates about the axle 196, the trace has a linear path, located substantially in the center of the strip 258, as shown in FIG. 11 and denoted by line segment C. In this mode, the follower 48 is, in actuality, recording the fact that the distance from the frame 12 to the surface A, taken at the location of the follower wheel 76, is equal to the distance from the frame to the surface taken at the front and rear rollers. Since the front and rear rollers are fixed with respect to the frame 12, the distance from the frame to the surface contacted by the rollers remains a constant, and serves as a datum from which the rotation of the follower 48 is measured.

For example, should the recorder 10 traverse a depression in the surface of a roll, denoted by line A' in FIG. 6, such that the depression is located between the front and rear rollers, the follower 48 will rotate downwardly away from the frame 12 and assume the position shown in FIG. 6 by dashed lines. This rotation of the follower 48 away from the frame 12 permits the coil spring 108 to cause the lever 88 to rotate about the shaft 100 in a clockwise direction. This rotation causes the stylus support member 92 to move from its normally substantially vertical orientation to an orientation shown by the dashed lines. The stylus 126, which is carried by the stylus support member 92, likewise is displaced to the right as shown in the Figure. The movement of the tip 134 is reflected on the trace shown in FIG. 11 as an arcuate segment, denoted by letter D.

Conversely, should the recorder 10 encounter a raised area on the roll, located between the front and rear rollers, the follower 48 would be raised from its normal position, thereby causing the lever 88 to rotate in a counterclockwise direction, and move the stylus 126, as it appears in FIG. 6, to the left. This movement would result in arcuate trace on an opposite side of strip 258 from segment D, shown as segment E. Should the recorder 10 then move onward to a level surface, the lever would again rotate clockwise until the stylus support member 92 again assumed a substantially vertical position, thereby returning the stylus 126 and stylus tip 134 to a position generating a straight centrally located line segment, denoted by letter F in FIG. 11.

Thus, the strip 258' contains an acurate record of the profile of the surface traversed by the recorder. This trace is maintained in a coiled position about the take up sleeve until needed.

Another important feature of the preferred embodiment of the recorder 10 is shown by comparing the recorder shown in FIG. 7 with that of FIG. 8. FIG. 7 shows the recorder 10 as it might appear prior to recording the profile of a surface A. The roll 184 is almost entirely coiled, save for a small section of strip 258 which has been uncoiled and fastened about the take up sleeve. With a roll 184 of this diameter, the support bracket 90 is displaced toward the pedestal 154 by the engagement of the stylus tip 134 with the roll. The stylus tip 134 is held against roll 184 by the spring 174. In addition, there is some resiliency in the stylus support bracket 120 so that the stylus may move relative to the arms 118. Similarly, the yoke 204 is urged against the roll 184 by spring 226 so that the uncoiler rollers 218 may engage the roll 184 to rotate it as the recorder traverses the surface A to be recorded.

By contrast, FIG. 8 shows the recorder 10 as it might appear after having traversed a portion of the surface A. The coil 184' is significantly smaller in diameter than it was at the start of the recording operation. The strip 258' has played out from coil 184' and now feeds into a recoil roll 264. In order to compensate for this gradually decreasing diameter of roll 184, the main shaft 148 is gradually displaced toward the roll by the spring 174 so that the stylus tip 134 remains in constant contact at about the same tracking pressure.

Similarly, as the diameter of roll 184 decreases, the yoke 204 is rotated by spring 226 about pins 208 so that the drive rollers 118 maintain constant contact with the roll 184 at about a constant force. In addition, since the uncoiler rollers 218 rotate with a constant velocity that is directly proportional to the velocity of rotation of the front rollers 32, the rate at which the strip 258' is played out from roll 184', and the rate at which the strip travels past the tip 134, remains constant throughout the period of use. This results in a trace, shown for example in FIG. 11, comprised of segments having a one-to-one correspondence to the distance of surface traversed; there is no distortion of the proportion or scale of the trace as the roll 184' decreases in diameter.

The recording device 180 of the preferred embodiment possesses an additional advantage. Again comparing the recorder as shown in FIG. 7 with the recorder as shown in FIG. 8, it is apparent that, as the recorder generates a trace, the diameter of the coiled strip of paper bearing the trace increases in diameter as the unused roll decreases in diameter. With the steady increase in diameter of the roll of paper taken up, the length of strip 258 taken up with each revolution of the roll 264 is greater than the ones preceding it. At some point during the generation of the trace the length of strip 258 taken with a rotation of the roll 264 will exceed that unraveled by the smaller diameter roll 184. In order to compensate for this fact, the belt 256 extending around the pulleys 252, 254 is permitted to slip when the strip 258 has reached a predetermined tension which would retard the rotation of the roll 264 from the rotation of the axle 234, 236. Preferably, the driving pulley 254 is sized such that the driven pulley 252 rotates axles 234, 236 so that the take up sleeve 238 always rotates at a speed that is sufficient to take up the strip 258 as it is played off of the roll 184' such that the strip is kep taut. To achieve this, the belt 256 preferably slips to some extent at all times during operation. Thus, the recorder of the present invention provides a stylus mounting assembly and a strip unraveling and take up assembly which compensates for a roll of paper which varies greatly in diameter in the course of use.

The recorder of the present invention preferably is made from aluminum which is relatively inexpensive and easy to machine. However, any lightweight metal which is easily machinable would be suitable. The front rollers, rear rollers, and follower wheel preferably are made of a rubber compound which has desirable frictional qualities which would prevent these rollers and wheels from slipping relative to the surface being recorded. Similarly, the uncoiler rollers which contact the paper roll should be made of a similar rubber compound having desirable frictional qualities so they will not slip with respect to the paper. The shafts and axles of the preferred embodiment preferably are made of steel or other material that is not easily bent or worn. The bearings, springs, and stylus are all of well-known design and are a matter of choice to one having skill in the art.

While the form of apparatus herein described constitutes a preferred embodiment of this invention, it is to be understood that the invention is not limited to this precise form of apparatus, and that changes may be made therein without departing from the scope of the invention.

What is claimed is:

1. A surface profile recorder comprising:
   a frame;
   front and rear roller means mounted to and extending below said frame;
   follower means rotatably mounted to said frame and having a portion capable of rotation from said frame to a position below said front and rear roller means;
   lever means including a follower engaging member and a substantially upright, elongate stylus support member;
   support means mounted to said frame pivotally mounting said lever means and including means urging said follower engaging member against said follower means such that rotation of said follower means causes said lever means to pivot in response thereto; and
   means including a stylus mounted to said support means for recording pivotal movement of said lever means and thereby recording rotational movement of said follower means.

2. The apparatus of claim 1 wherein said recording means includes a movable surface engaged by said stylus such that movement of said stylus in response to movement of said follower means leaves a trace on said movable surface.

3. The apparatus of claim 2 wherein said recording means further includes a strip of material having a coiled portion rotatably mounted to said frame, said strip having a face comprising said movable surface; and means for uncoiling said coiled portion such that said movable surface is brought into engagement with said stylus.

4. The apparatus of claim 3 wherein said support means includes means for urging said stylus against said movable surface.

5. The apparatus of claim 4 wherein said uncoiling means uncoils said coiled portion at a linear rate equal to the circumferential travel of at least said front roller means.

6. The apparatus of claim 5 wherein said recording means further includes means for recoiling said strip after engagement with said stylus.

7. A surface profile recorder comprising:
a frame;
front and rear roller means mounted to and extending below said frame;
follower means rotatably mounted to said frame and having a portion capable of rotation from said frame to a position below said front and rear roller means;
lever means responsive to rotation of said follower means;
means for recording movement of said lever means including a stylus mounted to said lever means, a strip of material having a coiled portion rotatably mounted to said frame and a face engaged by said stylus such that movement of said stylus in response to movement of said follower means leaves a trace on said face, and means for uncoiling said coiled portion such that said face is brought into engagement with said stylus at a linear rate equal to the circumferential travel of at least said front roller means;
means for recoiling said strip after engagement with said stylus including a yoke rotatably mounted to said frame, a recoiler axle rotatably mounted to said yoke and positioned to receive said strip from said coiled portion, and means for rotating said recoiler axle; and
means mounted to said frame rotatably supporting said lever means and including means for urging said stylus against said movable surface.

8. The apparatus of claim 7 wherein said uncoiling means comprises:
a drive axle rotatably mounted to said yoke;
at least one uncoiler roller mounted on said drive axle and positioned such that it may engage said coiled portion;
means for urging said uncoiler roller against said coiled portion; and
means for rotating said uncoiler roller and thereby uncoiling said coiled portion, simultaneously with the rotation of said front roller means.

9. The apparatus of claim 8 wherein said uncoiler rotating means comprises:
a first sprocket driven by said front roller means;
a second sprocket fixedly mounted to said drive axle; and
a sprocket chain extending about said first and second sprockets such that said uncoiler roller is positively driven by said front roller means.

10. The apparatus of claim 9 wherein said recoiler axle rotating means comprises a slip belt unit including a first pulley fixedly mounted to said drive axle, a second pulley fixedly mounted to said recoiler axle, and a resilient belt extending about said first and second pulleys, said first and second pulleys sized such that said strip may be uncoiled from said coiled portion and recoiled onto said recoiler axle such that a portion of said strip extending therebetween is held at all times in a predetermined amount of tension.

11. The apparatus of claim 10 wherein said supporting means comprises:
at least one pedestal mounted on said frame;
a ball bushing mounted in said pedestal;
a shaft slidably supported in said ball bushing and positioned normal to said coiled portion; and
a support bracket attached at an end of said shaft proximate said coiled portion, said support bracket receiving said lever means, and including a pair of stops extending toward said coiled portion and spaced to receive said lever therebetween such that said lever is constrained in rotational movement.

12. The apparatus of claim 11 wherein said means for urging said stylus includes second resilient means extending from said shaft to said pedestal.

13. The apparatus of claim 12 wherein said lever means comprises:
a pivot rotatably mounted to said support bracket;
a first arm extending outwardly from said pivot and terminating in a substantially flat bearing surface;
a second arm extending from said pivot and terminating in a bracket to receive said stylus, said second arm positioned between said stops; and
resilient means for urging said first arm into engagement with said follower means.

14. The apparatus of claim 13 wherein said follower means comprises:
a follower arm rotatably mounted at an end to said frame;
said follower arm extending at least to a point beneath said flat bearing surface;
means attached to said follower arm for engaging said flat bearing surface; and
a follower wheel rotatably mounted to said follower arm substantially beneath said engaging means.

15. The apparatus of claim 14 further comprising handle means attached to said frame.

16. A surface profile recorder comprising:
a frame;
front and rear roller means rotatably mounted to and extending outwardly from said frame;
follower means rotatably mounted to said frame and having a portion capable of rotation from said frame to a position below said front and rear roller means;
at least one pedestal mounted on said frame;
bearing means mounted in said pedestal;
a shaft slidably supported in said bearing means;
a support bracket attached at an end of said shaft proximate said follower means, and including a pair of stops extending toward said front roller means;
a pivot rotatably mounted to said support bracket;
a first arm extending outwardly from said pivot and terminating in a substantially flat bearing surface, said bearing surface engaging said follower means such that said first arm and said pivot rotate with respect to said support bracket in response to rotation of said follower means;
a second arm extending outwardly from said pivot and terminating in a stylus bracket, said second arm positioned between said stops of said support bracket such that said second arm is constrained in rotation by said stops;
resilient means for urging said first arm into engagement with said follower means;
a stylus mounted to said stylus bracket;
a strip of material having a coiled portion rotatably mounted to said frame, said strip having a face engaged by said stylus such that movement of said stylus in response to movement of said follower means leaves a trace on said face;

means for uncoiling said coiled portion such that said face is brought into engagement with said stylus;

a yoke rotatably mounted to said frame;

a recoiler axle rotatably mounted to said yoke and positioned to receive said strip from said coiled portion;

a drive axle rotatably mounted to said yoke;

at least one uncoiler roller mounted on said drive axle and positioned such that it may engage said coiled portion;

means for urging said uncoiler roller against said coiled portion;

a first sprocket driven by said front roller means;

a second sprocket fixedly mounted to said drive axle;

a sprocket chain extending about said first and second sprockets such that said uncoiler roller is positively driven by said front roller means; and a slip belt unit including a first pulley fixedly mounted to said drive axle, a second pulley fixedly mounted to said recoiler axle, and a resilient belt extending about said first and second pulleys, said first and second pulleys sized such that said strip may be uncoiled from said coiled portion and recoiled onto said recoiler axle such that a portion of said strip extending therebetween is held at all times in a predetermined amount of tension.

17. The apparatus of claim 16 wherein said follower means comprises:

a follower arm rotatably mounted at an end to said frame;

said follower arm extending at least to a point beneath said flat bearing surface;

means attached to said follower arm for engaging said flat bearing surface; and said portion comprising a follower wheel rotatably mounted to said follower arm substantially beneath said engaging means.

18. The apparatus of claim 17 wherein said uncoiling means uncoils said coiled portion at a linear rate equal to the circumferential travel of at least said front roller means.

19. The apparatus of claim 18 further comprising means for urging said stylus against said movable surface.

20. The apparatus of claim 19 wherein said means for urging said stylus includes second resilient means extending from said shaft to said pedestal.

21. The apparatus of claims 1, 14, 16, or 17 wherein said follower means is positioned on said frame such that said portion may be rotated in an arc which does not intersect a line of tangency between said front roller means and a surface or said rear roller means and a surface.

* * * * *

UNITED STATES PATENT AND TRADEMARK OFFICE
CERTIFICATE OF CORRECTION

PATENT NO. : 4,403,419

DATED : September 13, 1983

INVENTOR(S) : J. Robert Graves

It is certified that error appears in the above—identified patent and that said Letters Patent is hereby corrected as shown below:

Column 2, line 33, "and" should be --an--.
Column 5, line 13, "roken" should be --broken--.
Column 6, line 61, "by" should be --to--.
Column 7, line 61, "coil" should be --coiled--.
Column 8, line 48, "mechanially" should be --mechanically--.
Column 11, line 59, "taken with" should be --taken up with--.
Column 12, line 1, "kep" should be --kept--.
Column 12, line 51, "means" should be --member--.

Signed and Sealed this

Twenty-eighth Day of August 1984

[SEAL]

Attest:

GERALD J. MOSSINGHOFF

Attesting Officer

Commissioner of Patents and Trademarks